United States Patent Office 2,929,395
Patented Mar. 22, 1960

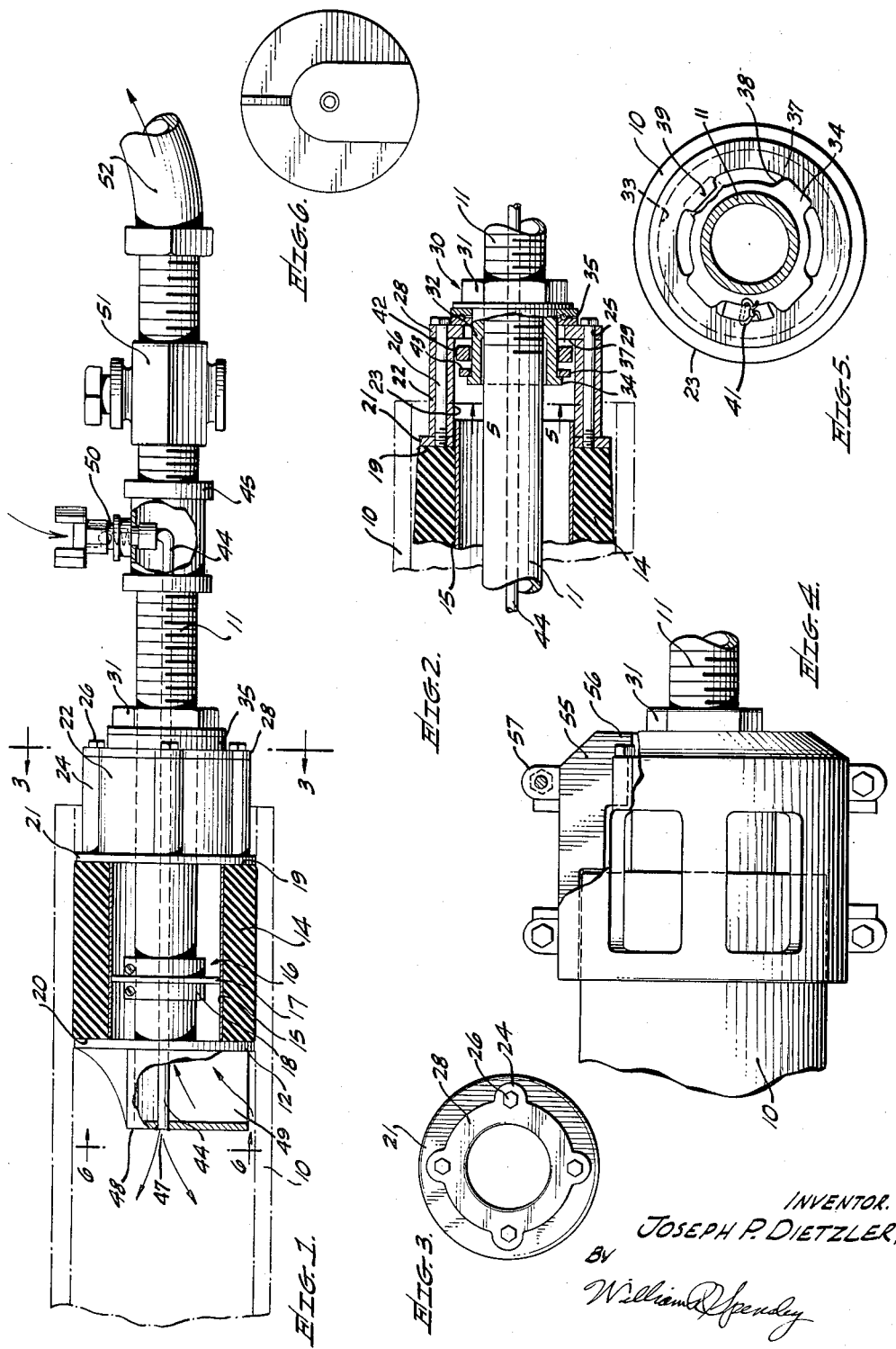

2,929,395

CLOSURE PLUGS FOR FLUID PIPES

Joseph P. Deitzler, Long Beach, Calif.

Application May 27, 1957, Serial No. 661,823

4 Claims. (Cl. 137—212)

This invention relates to closure plugs for fluid pipes, and more particularly to an improved closure plug for pipes and conduit containing fluid under pressure.

In many operations, such as repair and maintenance of equipment having pipes or conduits containing fluid under pressure, it is necessary to plug the open end of a pipe to contain the fluid within. In addition, pipes are often plugged at the end to test for leaks in a span of pipe. In pipe plugs of the type heretofore known to the art many disadvantages are present; for example, the plug is often not able to withstand the fluid pressure and is forced out of the pipe; in other instances after the plug has been in the pipe for a length of time it cannot be withdrawn; and, in addition, when the plug is removed the fluid within the pipe escapes and floods the working area. That is, for example, when a water pipe is closed by a plug in a working ditch and the plug is removed temporarily the water within the pipe, which has backed up behind the plug, flows into the working ditch and renders working conditions unsatisfactory.

Accordingly, it is an object of the present invention to provide an improved closure plug for fluid pipes which is capable of withstanding pressures in excess of the pressure contained by closure plugs heretofore known to the art.

It is another object of the present invention to provide an improved closure plug for fluid pipes which may be readily and easily removed from the pipe.

It is a further object of the present invention to provide an improved closure plug having means for extracting fluid from the pipe by pressure.

Another object of the present invention is to provide an improved closure plug for pipes which has a greater area of sealing surface in sealing contact with the inner surface of the pipe.

It is a still further object of the present invention to provide an improved closure plug for fluid pipes which may be readily and easily installed in the pipe without damage to the pipe.

The present invention is an improved closure plug comprising a resilient cylindrical sealing member which is slidably mounted upon a cylindrical sleeve. The sealing member is mounted between, and affixed to, pressure plates which are movable along the axis of the sealing member to compress and retract the sealing member. A pressure nut and thrust bearing are provided to exert compressive force and a retracting force upon the sealing member through the pressure plate. An air inlet extends through the closure plug to the inner end thereof with a water outlet provided from the inner end of the plug to the exterior of the plug when the plug is in place within a pipe.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

Fig. 1 is a partially cross-sectional view of the assembled plug inserted into a fluid pipe;

Fig. 2 is a partial view in cross-section of the outer end of the plug assembly;

Fig. 3 is a sectional view in elevation taken along line 3—3 of Fig. 1;

Fig. 4 is a partial view in elevation of the outer end of the plug assembly with the mateable retaining collar in place on the plug;

Fig. 5 is an enlarged cross-sectional view taken along line 5—5 of Fig. 2; and

Fig. 6 is an end view taken along line 6—6 of Fig. 1.

Referring now to the drawing, and particularly to Fig. 1, the closure plug of the present invention includes a plug body comprising a body mandrel 11 which extends symmetrically along the longitudinal axis of the plug. The mandrel is tubular in configuration and is threaded along a portion of its length as described hereinafter. An end plate 12 is affixed to the inner end of the mandrel and defines an opening therethrough symmetrical with respect to the longitudinal axis of the plug and substantially coextensive with the opening through the tubular mandrel. The outside diameter of the end p ate 12 is substantially equal to but less than the inside diameter of the pipe or conduit to be plugged, and will accordingly vary with the size of the plug and pipe.

A sealing member 14, formed of resilient material such as rubber or elastomeric material, is cylindrica: in configuration and of substantial length. The outside diameter of the sealing member 14 is also substantially equal to but less than the diameter of the pipe when the sealing member is in the relaxed or undeformed condition. The outer cylindrical surface is slightly tapered longitudinally. In the present embodiment a double taper is used such that the diameter is greatest near the midpoint and slightly less at each end to force fluid away from the pipe surface. The sealing member 14 is slidably mounted upon a sleeve 15 such that the outside diameter of the sleeve and the inside diameter of the sealing member are approximately equal. The inside diameter of the sleeve 15 is substantially greater than the outside diameter of the mandrel 11 and is symmetrically spaced therefrom by a spacer means 16 which is removably affixed to the mandrel. The spacer means 16 includes a spacer plate 17 which is mounted by means of a clamp 18 in a plane perpendicular to the axis of the plug. The outside diameter of the spacer plate is substantially equal to the inside diameter of the sleeve 15 and accordingly maintains the sleeve symmetrical with respect to the axis of the plug. The length of the sleeve 15 is substantially greater than the length of the sealing member 14, as shown in Fig. 2, such that it extends beyond the sealing member at the outer end 19 thereof for purposes which will become more apparent hereinafter. The optimum length, outside diameter and inside diameter of the sealing element, are dependent upon the application of the plug and the size of the pipe and may be determined by one skilled in the art in view of the description herein.

The inner end 20 of the sealing member 14 is affixed to the surface of the end plate 12 by bonding, vulcanization, or other means known to the art.

A pressure plate 21 is mounted upon the plug mandrel by means of a pressure collar 22. The pressure plate has an outside diameter substantially equal to the outside diameter of the sealing member 14 and an inside diameter substantially equal to but greater than the outside diameter of the sleeve 15. Thus, the pressure plate is mounted adjacent the outer end of the sealing member and perpendicular to the axis of the plug. The inner surface of the pressure plate 21 is bonded or otherwise affixed to the outer end 19 of the sealing member such that the sleeve 15 is longitudinally movable along the inner diameter of the pressure plate.

Referring now particularly to Figs. 1, 2 and 3, the pressure collar 22 is integral or mateable with the pressure plate and extends longitudinally therefrom with an inside diameter substantially equal to the outside diameter of the sleeve 15. The outside diameter of the pressure collar 22 defines a plurality of circumferentially spaced protrusions 24 having longitudinal openings 25 through which affixing bolts 26 may be inserted. An inwardly extending flange 28 is mounted adjacent the pressure collar by means of the affixing bolts 26 which extend through the flange 28 and openings 25 and into the pressure plate 21. The inside diameter of the flange 28 is substantially less than the inside diameter of the pressure collar 22 but greater than the outside diameter of the body mandrel 11, thus forming an internal shoulder 29.

A pressure nut subassembly 30, including a pressure nut 31 and a retracting nut 32, are threadably mounted upon the mandrel body and extend longitudinally through the opening of the flange 28. The mandrel 11 is threaded along a portion of its length extending from the exterior end of the mandrel to a position inward of the position to which the pressure nut will travel. Thus, referring to Figs. 1 and 2, the mandrel is threaded to the left of the flange 28 by an amount sufficient to allow complete travel of the pressure nut as described hereinafter in connection with the operation of the plug. The pressure nut 31 and retracting nut 32 are threadably mateable with the mandrel. The pressure nut 31 is spaced from the pressure flange 28 by a substantial distance and is separated therefrom by a thrust bearing 35 which is rotatably mounted upon the retracting nut 32. In the present embodiment a ball bearing thrust bearing is utilized for ease of operation. The retracting nut 32 has an outside diameter substantially less than the inside diameter of the opening through the flange 28, and extends through the flange 28 to protrude inwardly from the flange shoulder 29. The outer end of the retracting nut 32 is affixed to the inner face of the pressure nut 31 such that the retracting nut is rotated with the pressure nut. At the inner end of the retracting nut 32 an outwardly extending flange 34 is provided, having an outside diameter substantially equal to but less than the inside diameter of the flange 28 and the inside diameter of the thrust bearing 35.

Referring now particularly to Figs. 2 and 5, means are provided to assemble the pressure nut subassembly through the thrust bearing and pressure flange and to provide a retracting surface. Fig. 5 is an enlarged view taken along line 5—5 of Fig. 2 showing in phantom the inside diameter 23 of the pressure collar 22 with the pressure nut subassembly assembled therein. Although other means, such as threaded protrusions, may be used a male-female fastener is utilized in the present embodiment to facilitate assembly. Thus, a plurality of radial indentations 38 are circumferentially spaced about the outside diameter of the flange 34 as female openings in the flange. A lock ring 37 has an inside diameter substantially equal to but greater than the outside diameter of the flange 34, and an outside diameter substantially greater than the inside diameter 33 of the flange 28 and thrust bearing 35. A plurality of inwardly extending protrusions 39 are provided on the inside diameter as male elements which are circumferentially spaced and mateable with the indentations in the flange 34. Thus, the pressure nut subassembly is assembled in the plug by extending the retracting nut through the thrust bearing 35 and flange 28. The locking ring is then placed on the retracting nut by inserting the inward protrusions longitudinally through the depressions and turning the locking ring a partial turn to a locked position. A key 41, or similar locking means, is inserted through openings in the lock ring 37 and flange 34 to prevent relative rotation therebetween, and the pressure nut subassembly is locked in assembled position. In the present embodiment an internal thrust bearing 42 is positioned between the pressure surface 43 of the lock ring 37 and the inner surface of the flange 28.

An air inlet line 44 is connected into the body mandrel 11 by means of a T 45 which is threadably connected into the mandrel outwardly of the pressure nut as shown in Fig. 1. The air inlet line 44 extends from the T longitudinally through the mandrel 11 to the interior of the pipe when the plug is in position as shown in Fig. 1. The inner end 47 of the air inlet 44 extends through and is affixed to the wall 48 of the water outlet passage 49. The water outlet passage is open toward the lower surface of the pipe or plug and defines a closed water passage which is coextensive with the opening through the mandrel 11.

A check valve 50, of the type well known to the art, is affixed to the air inlet line at the T 45 to allow inward passage of air while preventing the outward passage of air. A fluid valve 51 is provided in the mandrel outwardly from the T 45. The valve is of the type well known to the art which allows the passage of fluid when the valve is open and prevents passage when closed. A flexible line 52 is coupled to the outer end of the mandrel to allow the fluid to be exhausted away from the working area around the plug.

Referring to Fig. 4, a blow-out collar 55 is provided which is mateable with the pipe being closed and the closure plug in accordance with this invention. That is, the blow-out collar 55 has an internal configuration mateable with the end of the pipe 10 and the protruding portion of the plug. An inwardly extending flange 56 prevents outward movement of the plug when the collar is clamped upon the end of the pipe by means of the clamps 57. In addition, use of the blow-out collar prevents damage to the pipe due to any excessive radial pressure exerted by the plug.

Thus, in operation the plug is assembled by inserting the pressure nut assembly 30 through the thrust bearing 35, flange 28, and thrust bearing 42 and locking the assembly into place as described hereinbefore. The flange 28 and pressure collar 22 are then affixed to the pressure plate 21 by means of the bolts 26. The plug is inserted into the end of the pipe 10 to the position at which the pressure plate 21 is within the pipe. By turning the pressure nut to cause inward movement, i.e., to the left in Fig. 1, the sealing member is subjected to longitudinal pressure or compression between the end plate 12 and the pressure plate 21. Since the sealing member is substantially incompressible it is deformed radially outward against the inner surface of the pipe. As greater pressure is applied through the thrust bearing to the pressure plate 21 the complete external surface of the sealing member 12 comes into pressure contact with the pipe and effectively seals it against large pressures within the pipe.

To exhaust fluid from the pipe the fluid valve 51 is opened and air under pressure is forced through the air inlet 44 to the interior of the pipe. A slight rise in pressure due to the air will cause the fluid to enter the fluid outlet passage near the bottom of the pipe and to flow through the mandrel 11, the fluid valve 51 and the fluid exhaust 52.

In order to remove the plug from the pipe the pressure nut 31 is rotated to travel to the right in Fig. 1 until the lock ring 37 exerts pressure upon the flange 28 at the shoulder 29 through the thrust bearing 42. As the pressure nut is moved, the flange 28, and accordingly the pressure plate 21, are forced to move outward, or to the right. Since the sealing member is affixed to the end plate 12 and pressure plate 21 it is caused to increase in length and, in turn, to be radially reduced. Thus, the sealing surface of the pipe and the plug can be easily removed from the pipe.

Thus, the present invention provides an improved closure plug for fluid pipes which can be easily inserted and removed from the pipe. In addition, the plug has a large area of sealing contact with the pipe and will maintain the closure against high pressures. The closure plug in accordance with this invention provides for the positive exhaust of fluid from the pipe by air pressure to remove the fluid from the pipe and away from the plug and working area.

What is claimed is:

1. A closure plug for pipes and conduits comprising: a longitudinally extending tubular mandrel; a cylindrical sleeve symmetrically mounted with respect to the axis of said mandrel and radially spaced therefrom; a resilient sealing element, said sealing element being substantially cylindrical in configuration, said sealing element slidably mounted upon said sleeve; an end plate affixed to said mandrel substantially perpendicular to the axis of said mandrel, said end plate being positioned adjacent a first end of said sealing element and affixed thereto; a pressure plate positioned substantially perpendicular to said axis proximate the second end of said sealing element and affixed thereto, said pressure plate being longitudinally movable with respect to said mandrel; means for longitudinally moving said pressure plate; an air inlet line extending through said mandrel to the inner end thereof; and a fluid passage from the inner end of said mandrel through the tubular opening thereof.

2. An end closure plug for pipes to be plugged at an open end thereof comprising: a longitudinally extending tubular mandrel; a cylindrical sleeve symmetrically mounted with respect to the axis of said mandrel and radially spaced therefrom; a resilient sealing element being substantially cylindrical in configuration having an inside diameter substantially equal to the outside diameter of said sleeve and an outside diameter substantially equal to the inside diameter of the pipe to be plugged, said outside diameter being slightly tapered longitudinally; said sealing element slidably mounted upon said sleeve; an end plate affixed to said mandrel at a first end thereof substantially perpendicularly to the axis of said mandrel; said end plate defining an opening therethrough coextensive with the tubular opening of said mandrel, said end plate positioned adjacent a first end of said sealing element and affixed thereto; a pressure plate positioned proximate the second end of said sealing element and affixed thereto, said pressure plate defining an inside diameter substantially equal to but greater than the outside diameter of said sleeve, said pressure plate being longitudinally movable with respect to said mandrel; a pressure nut threadably mateable with said mandrel and longitudinally movable with respect thereto, a thrust bearing spaced between said pressure nut and said pressure plate at one side thereof; a retracting nut affixed to said pressure nut, a thrust bearing spaced between said retracting nut and the second side of said pressure plate whereby the pressure plate is moved in the direction of movement of said pressure nut; air inlet means extending through said mandrel and through said end plate; and fluid outlet means extending from said end plate through said tubular mandrel to the exterior of said plug.

3. An end closure plug for pipes to be plugged at an open end thereof comprising: a longitudinally extending tubular mandrel having an inner end adapted to be inserted into a pipe to be plugged, a cylindrical sleeve symmetrically mounted with respect to the axis of said mandrel and radially spaced therefrom; an elastomeric sealing element, said sealing element being substantially cylindrical in configuration having an inside diameter substantially equal to the outside diameter of said sleeve and an outside diameter substantially equal to the inside diameter of the pipe to be plugged, said outside diameter having a longitudinal taper inwardly toward both ends thereof from a point proximate the longitudinal centerpoint of said element, said sealing element being slidably mounted upon said sleeve for longitudinal movement with respect thereto; an end plate affixed to said mandrel proximate the inner end thereof substantially perpendicularly to the axis of said mandrel, said end plate having an outside diameter substantially equal to but less than the outside diameter of said sealing element and defining an opening therethrough coextensive with the opening of said mandrel; a first end of said sleeve positioned adjacent said end plate; a first end of said sealing element positioned adjacent said end plate and affixed thereto; a pressure plate positioned proximate the second end of said sealing element, said pressure plate having an outside diameter substantially equal to the outside diameter of said sealing element, said sealing element being affixed at the second end thereof to the inward surface of said pressure plate, said pressure plate having an inside diameter substantially equal to but greater than the outside diameter of said sleeve, said sleeve extending through said pressure plate, said pressure plate being longitudinally movable with respect to said mandrel and said sleeve; an inwardly extending radial shoulder affixed to said pressure plate and spaced from the outward surface of said pressure plate, said shoulder having an inside diameter greater than the diameter of said mandrel; a pressure nut threadably mateable with said mandrel and longitudinally movable with respect thereto, a thrust bearing positioned between said pressure nut and the outward surface of said shoulder; a retracting nut affixed to said pressure nut, said retracting nut defining an outwardly extending flange, said flange being engageable with the inward surface of said shoulder whereby said flange and pressure plate are moved in the direction of movement of said pressure nut; air inlet means extending through said mandrel and through said end plate; and fluid outlet means extending from a low liquid level position of said end plate in said pipe through said tubular mandrel to the exterior of said plug.

4. A pipe closure plug as defined in claim 3 for plugging an open end of a pipe which also includes in combination therewith a pipe sleeve surrounding said plug in longitudinal engagement therewith, said pipe sleeve defining a cylindrical surface having an inside diameter substantially equal to the outside diameter of the pipe to be plugged, said inside diameter being in bearing engagement with said pipe, said pipe sleeve defining an inwardly extending transverse shoulder, said shoulder being in longitudinal engagement with a transverse shoulder of said plug.

References Cited in the file of this patent
UNITED STATES PATENTS

| | | |
|---|---|---|
| 595,189 | Mern | Dec. 7, 1897 |
| 1,059,053 | Lennon | Apr. 15, 1913 |
| 1,558,161 | Gunderson | Oct. 20, 1925 |
| 1,808,411 | Hinkston | June 2, 1931 |
| 2,707,967 | Adams et al. | May 10, 1955 |